United States Patent
Wang

(10) Patent No.: US 10,522,046 B2
(45) Date of Patent: Dec. 31, 2019

(54) POSITION REPORTING FOR VEHICLES

(71) Applicant: Honeywell International Inc., Morris Plains, NJ (US)

(72) Inventor: Haiming Wang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 154 days.

(21) Appl. No.: 15/668,037

(22) Filed: Aug. 3, 2017

(65) Prior Publication Data

US 2019/0043367 A1    Feb. 7, 2019

(51) Int. Cl.
| | |
|---|---|
| *G08G 5/00* | (2006.01) |
| *G05D 1/00* | (2006.01) |
| *B64C 39/02* | (2006.01) |
| *G01S 19/14* | (2010.01) |
| *G01S 5/00* | (2006.01) |

(Continued)

(52) U.S. Cl.
CPC ........... *G08G 5/006* (2013.01); *B64C 39/024* (2013.01); *G01S 5/0027* (2013.01); *G01S 19/14* (2013.01); *G05D 1/0055* (2013.01); *G08G 5/0008* (2013.01); *G08G 5/0013* (2013.01); *G08G 5/0021* (2013.01); *G08G 5/0069* (2013.01); *G01S 19/42* (2013.01); *H04W 84/042* (2013.01)

(58) Field of Classification Search
CPC ..... G08G 5/006; B64C 39/024; G01S 5/0027; G01S 19/14
See application file for complete search history.

(56) References Cited

U.S. PATENT DOCUMENTS

| | | |
|---|---|---|
| 8,019,529 B1 | 9/2011 | Sharma et al. |
| 8,897,770 B1 | 11/2014 | Frolov et al. |
| 9,311,821 B2 | 4/2016 | Melum et al. |

(Continued)

FOREIGN PATENT DOCUMENTS

| | | |
|---|---|---|
| CN | 105867272 A1 | 8/2016 |
| CN | 105913692 A | 8/2016 |

(Continued)

OTHER PUBLICATIONS

Extended Search Report from counterpart European Application No. 18186644.3, dated Jan. 23, 2019, 12 pp.

(Continued)

*Primary Examiner* — Michael D Lang
(74) *Attorney, Agent, or Firm* — Shumaker & Sieffert, P.A.

(57) ABSTRACT

In some examples, a system for transmitting a location of an ownship vehicle is configured to be mounted on the ownship vehicle and includes a positioning system configured to receive positioning signals. In some examples, the system also includes a cellular transceiver, a surveillance transceiver, and processing circuitry configured to determine a position of the ownship vehicle based on the positioning signals. In some examples, the processing circuitry is further configured to determine that the ownship vehicle is located in an identified risk volume based on the position of the ownship vehicle and to cause the surveillance transceiver and the cellular transceiver to simultaneously transmit surveillance signals and cellular signals indicating the position of the ownship vehicle in response to determining that the ownship vehicle is located in the identified risk volume.

20 Claims, 6 Drawing Sheets

(51) Int. Cl.
*H04W 84/04* (2009.01)
*G01S 19/42* (2010.01)

(56) References Cited

U.S. PATENT DOCUMENTS

| | | |
|---|---|---|
| 9,589,473 B1 | 3/2017 | Seo et al. |
| 2012/0123806 A1* | 5/2012 | Schumann, Jr. ............................ G08G 1/096775 705/4 |
| 2016/0196750 A1 | 7/2016 | Collins |
| 2016/0275801 A1 | 9/2016 | Kopardekar |
| 2017/0016735 A1 | 1/2017 | Gordon et al. |
| 2017/0045884 A1 | 2/2017 | Kablaoui |

FOREIGN PATENT DOCUMENTS

| | | |
|---|---|---|
| EP | 3336577 A1 | 6/2018 |
| WO | 0163318 A1 | 8/2001 |
| WO | 20140043824 A1 | 3/2014 |
| WO | 2016210110 A1 | 12/2016 |

OTHER PUBLICATIONS

Response to Extended Search Report dated Jan. 23, 2019, from counterpart European Application No. 18186644.3, filed Jul. 12, 2019, 28 pp.

\* cited by examiner

POSITION REPORTING FOR VEHICLES

TECHNICAL FIELD

This disclosure relates to collision prevention for vehicles.

BACKGROUND

Vehicle traffic control systems, such as air traffic control systems, track positions and velocities of vehicles and help manage the flight paths of the vehicles. Vehicle traffic control may be based on radar surveillance, supplemented more recently with cooperative radio surveillance techniques, such as automatic dependent surveillance-broadcast (ADS-B). A vehicle may determine its own position, using, for example, a Global Navigation Satellite System (GNSS) configured to transmit positioning signals from multiple satellites to a receiver on the vehicle. The vehicle may periodically broadcast its position via surveillance signals at a radio frequency. Other vehicles and base stations may receive and read the surveillance signals to determine a location for the vehicle. Vehicle position data may be provided to a variety of other applications that serve functions such as traffic situational awareness, traffic alert, and collision avoidance, for example.

SUMMARY

This disclosure is directed to systems, devices, and methods for transmitting the position of an ownship vehicle by a surveillance transceiver and a cellular transceiver. In some examples, processing circuitry may be configured to determine that the ownship vehicle is located in an identified risk volume and cause the surveillance transceiver and the cellular transceiver to simultaneously transmit signals indicating the position of the ownship vehicle in response to the risk-volume determination. In some examples, the processing circuitry may be configured to compare a quality level for surveillance communication or cellular communication to a threshold level when the ownship vehicle is located outside of an identified risk volume. The processing circuitry may be configured to cause either the surveillance transceiver or the cellular transceiver to transmit signals indicating the position of the ownship vehicle in response to the quality-level determination.

In one example, a system for transmitting a location of an ownship vehicle is configured to be mounted on the ownship vehicle, and the system includes a positioning system configured to receive positioning signals. The system also includes a cellular transceiver, a surveillance transceiver, and processing circuitry configured to determine a position of the ownship vehicle based on the positioning signals. The processing circuitry is further configured to determine that the ownship vehicle is located in an identified risk volume based on the position of the ownship vehicle and cause the surveillance transceiver to transmit surveillance signals indicating the position of the ownship vehicle in response to determining that the ownship vehicle is located in the identified risk volume. The processing circuitry is also configured to cause the cellular transceiver to transmit cellular signals indicating the position of the ownship vehicle simultaneously with the surveillance transceiver transmitting the surveillance signals in response to determining that the ownship vehicle is located in the identified risk volume.

In another example, a method for transmitting a location of an ownship vehicle includes receiving positioning signals and determining a position of the ownship vehicle based on the positioning signals. The method also includes determining that, in a first instance, the ownship vehicle is located in an identified risk volume based on the position of the ownship vehicle. The method further includes cause a surveillance transceiver to transmit surveillance signals indicating the position of the ownship vehicle in response to determining that the ownship vehicle is located in the identified risk volume. The method includes cause a cellular transceiver to transmit cellular signals indicating the position of the ownship vehicle simultaneously with the surveillance transceiver transmitting the surveillance signals in response to determining that the ownship vehicle is located in the identified risk volume.

Another example is directed to a system for transmitting a location of an ownship vehicle, wherein the system is configured to be mounted on the ownship vehicle, and the system includes a positioning system configured to receive positioning signals, a cellular transceiver, and a surveillance transceiver. The system also includes processing circuitry configured to determine a position of the ownship vehicle based on the positioning signals and determine that a quality level for cellular communication is less than a threshold quality level for cellular communication. The processing circuitry is further configured to cause the surveillance transceiver to transmit surveillance signals indicating the position of the ownship vehicle in response to determining that the quality level for cellular communication is less than the threshold quality level for cellular communication The details of one or more examples are set forth in the accompanying drawings and the description below. Other features, objects, and advantages will be apparent from the description and drawings, and from the claims.

DETAILED DESCRIPTION

Figure 1:
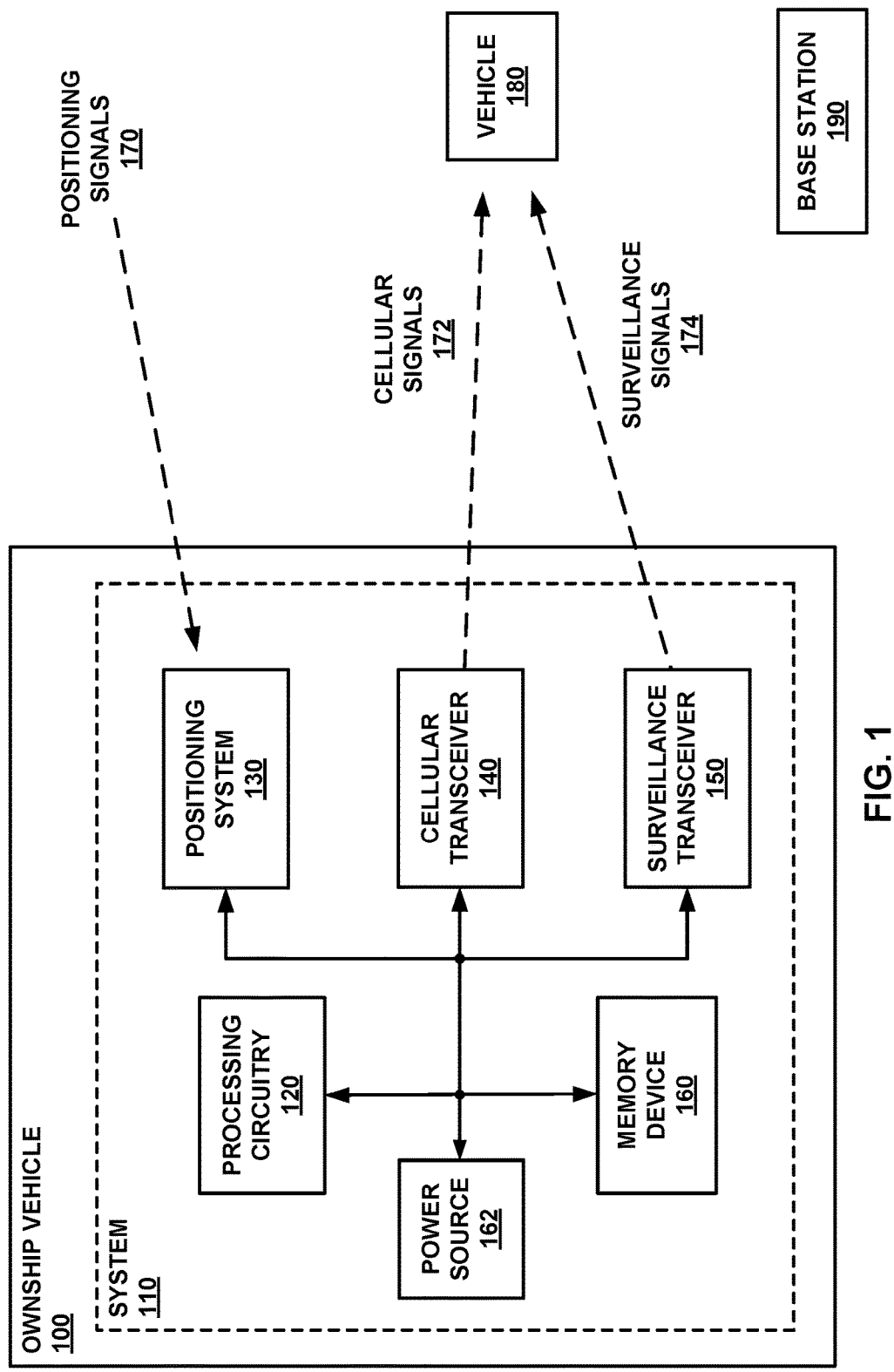
FIG. 1 is a conceptual block diagram of a system for transmitting a position of an ownship vehicle, in accordance with some examples of this disclosure.

Various examples are described below generally directed to devices, systems, and methods for transmitting a position of an ownship vehicle. A system of this disclosure includes more than one means for transmitting signals indicating the position of the ownship vehicle, such as a surveillance transceiver and a cellular transceiver. The system also includes processing circuitry configured to selectively cause one or more of the transceivers to transmit the signals indicating the position of the ownship vehicle.

For example, if a first form of communication associated with a first transceiver has a quality level that is less than a threshold level, the processing circuitry may cause a second transceiver to transmit signals indicating the position of the ownship vehicle. If a second form of communication associated with the second transceiver has a quality level that is less than a threshold level for the second form of communication, the processing circuitry may cause the first transceiver to transmit signals indicating the position of the ownship vehicle. When the ownship vehicle is located in an identified risk volume, the processing circuitry may cause both the first transceiver and the second transceiver to transmit signals indicating the position of the ownship vehicle. When the quality level for more than one form of communication is less than the threshold levels, the processing circuitry may cause the ownship vehicle to perform a safety maneuver, such as a landing maneuver or/and a stopping maneuver.

The techniques of this disclosure may apply to uncrewed aerial vehicles (UAV's), which are aerial vehicles that do not need a pilot onboard. UAV's may be configured to automatically fly under the control of special electronic equipment. Potential applications for UAV's include aerial photography, firefighting, search and rescue, agriculture, media, commercial and professional videography and photography, police reconnaissance, security monitoring, disaster relief, patrolling, tracking, exploration surveys, environmental and weather monitoring, scientific investigation, as well as numerous other potential applications. A system of this disclosure may be configured to mount on a UAV, such as a small UAV and/or a commercial UAV.

UAV Traffic Management (UTM) is a concept being advanced by the United States Federal Aviation Administration (FAA), and other countries are closely watching the development with similar activities underway in those countries. Concepts similar to UTM may also apply to uncrewed vehicles other than UAV's and/or crewed vehicles. UTM includes UAV position monitoring, and sensing and avoidance technology. One existing way to implement position accusation and reporting is ADS-B (Automatic Dependent Surveillance—Broadcast) by transmitting or broadcasting the position of the ownship vehicle automatically so that other vehicle(s) and/or base station(s) can determine the position of the ownship vehicle. The ADS-B method, which is just one example of surveillance signal communication, is an agreed-upon way to trace the manned aircraft positions as well as sense and avoid in the aviation industry.

Applying the ADS-B mechanism to UAVs may create a common positioning technology that could be expanded over airspace across the world. However, simultaneous ADS-B transmission from a large number of UAV's may create traffic congestion and large interference to UAV or manned aircraft. Thus, sometimes ADS-B may be not usable for UAV's due to heavy congestion and interference, which may cause low quality levels for ADS-B signals. Position information may be useful for coordinating traffic (e.g., landing and takeoff) at an airport or other hub. Position information may also be useful to detect vehicles that are located in unauthorized areas or that otherwise pose security concerns. By using both surveillance and cellular broadcasts, a vehicle may increase the chances that the broadcasts are received by other vehicles and base stations, as compared to a vehicle with only cellular broadcasts or only surveillance broadcasts.

A second existing way to monitor and determine vehicle positions is a radar device. However, a radar device might be ineffective or unreliable if being used in an urban area because of a great deal of clutter from buildings and other manmade objects. The clutter from buildings and objects may cause false alarms. A third existing way to determine vehicle positions is radio/cellular technology that can be used by the processing circuitry to determine vehicle positions via Observed Time Difference of Arrival (OTDOA). Radio/cellular technology may also allow transmission of a vehicle position via cellular Device to Device (D2D) communication. However, a cellular network will sometimes be highly loaded by mobile terminals, use for transmitting vehicle position information may not be feasible. In some examples, the achievable positioning accuracy for cellular technology is only about fifty meters to one hundred and fifty meters, which is much coarser than that achievable with Global Navigation Satellite System (GNSS).

One or more of a surveillance transceiver (e.g., an ADS-B transceiver), a radar device, and a cellular transceiver may be used for monitoring and determining vehicle positions. However, in some situations surveillance communication and/or cellular communication may have a quality level that is less than a threshold level, wherein the threshold level may represent a desired quality level based on the operational circumstances of the ownship vehicle. In some examples, the threshold level may be a minimum level for adequate service. This disclosure describes techniques for selectively communicating via a surveillance transceiver and/or a cellular transceiver to potentially improve the safety and system robustness of a vehicle system. The techniques of this disclosure may increase the effectiveness of the communication, while conserving power and reducing interference when one form of communication has a sufficient quality level. The techniques of this disclosure may also increase safety in an identified risk volume by causing both the surveillance transceiver and the cellular transceiver to transmit signals indicating the position of the ownship vehicle.

Cellular transmission may be particularly effective for vehicles that operate at or close to the surface of the earth, such as below one thousand feet above the surface, two thousand feet above the surface, or any other altitude. In some examples, the hardware for cellular transmission may be lighter and less expensive than the hardware for surveillance transmission (e.g., ADS-B out hardware). Cellular transmission may also be used by airborne vehicles at higher altitudes, but the distance to a cellular base station (e.g., a cellular tower) may reduce the effectiveness. Using two forms of transmission may also be particularly useful for uncrewed vehicles, which lack a human operator who use eyesight to avoid obstacles, vehicles, and terrain.

As used herein, the terms "broadcast," "report," "transmit," and "communicate" may have similar definitions. For example, a transceiver may broadcast, report, transmit, or communicate a signal indicating the position of the ownship vehicle. Processing circuitry may cause a transceiver to broadcast, report, transmit, or communicate a signal by delivering the signal to one or more antennas of the transceiver. Other vehicles or a base station may receive the signal, broadcast, report, or communication from the transceiver and decode or process the information to determine the position of the ownship vehicle.

FIG. 1 is a conceptual block diagram of a system 110 for transmitting a position of an ownship vehicle 100, in accordance with some examples of this disclosure. System 110 is one example of a system of this disclosure configured to transmit signals indicating a position of an ownship vehicle via one or more transceivers. System 110 includes processing circuitry 120, positioning system 130, cellular transceiver 140, surveillance transceiver 150, and memory device 160. System 110 may also include other components not depicted in FIG. 1, such as a phased-array radar device configured to transmit and receive radar signals. Processing circuitry 120 may be configured to determine the position and velocity of objects based on the returned radar signals. System 110 may also receive data from and/or deliver data to a user interface configured to receive user inputs and present vehicle position information.

Ownship vehicle 100 and/or vehicle 180 can be any mobile object or remote object. For example, vehicles 100 and/or 180 may be an aircraft such as an airplane a helicopter or a weather balloon, or a space vehicle such as a satellite or spaceship. In some examples, vehicles 100 and/or 180 may include a land vehicle such as an automobile or a water vehicle such as a ship or a submarine. Vehicles 100 and/or 180 may also be a crewed vehicle or an uncrewed vehicle, such as a drone, a remote-control vehicle, or any suitable vehicle without any pilot or crew on board. In some examples, system 110 may be mounted in the nose, the front, the rear, the bottom, and/or the top of ownship vehicle 100, and components of system 110 may be mounted in multiple locations on ownship vehicle 100. In some examples, system 110 may be an after-market product, or add-on accessory, to ownship vehicle 100. In other example, system 110 may be highly integrated into ownship vehicle 100.

Ownship vehicle 100 may be a relatively low-weight and low-cost unmanned aerial vehicles (UAV's) (e.g., Group I and Group II UAV's). A slower-moving UAV (e.g., a smaller, recreational UAV), such as a hovering UAV, may be well-suited for system 110 because position information may change less between broadcasts, as compared to faster-moving UAV's. Ownship vehicle 100 may be any UAV with access to a cellular network. In some examples, ownship vehicle 100 may be any UAV, regardless of the type, weight, or group classification of the UAV, that operates at altitudes of less than five hundred meters. Depending on the location, the operating altitudes for adequate cellular access may be higher or lower than five hundred meters.

Processing circuitry 120 is configured to determine a position of ownship vehicle 100 based on positioning signals 170. Processing circuitry 120 may be configured to determine that ownship vehicle 100 is located in an identified risk volume based on the position of ownship vehicle 100 as determined from positioning signals 170. The identified risk volume may be centered on a site (e.g., a sensitive location) such as a power station or a high-traffic location such as an airport. The identified risk volume may be defined as a spherical volume or semi-spherical volume, a cylindrical volume, a cubic volume, or a rectangular volume centered on the sensitive location or high-traffic location.

In response to determining that ownship vehicle 100 is located in the identified risk volume, processing circuitry 120 may be configured to cause transceivers 140 and 150 to simultaneously transmit signals 172 and 174 indicating the position of ownship vehicle 100. "Simultaneous transmission" may mean that signals 172 and 174 completely or partially overlap in time. In some examples, the active durations of signals 172 and 174 may not overlap because there may be durations between the active durations of signals 172 and 174 during which neither of transceivers 140 and 150 is actively transmitting. "Simultaneous transmission" may also mean that transceivers 140 and 150 are both operating at approximately the same time, such that signals 172 and 174 occur within two seconds or five seconds of each other. Processing circuitry 120 is configured to encode the position of ownship vehicle 100 in cellular signals 172 based on a cellular protocol such as GSM (Global System for Mobile Communications), UMTS (Universal Mobile Telecommunications System), LTE (Long Term Evolution), or IMT (International Mobile Telecommunications) Advanced. It is also contemplated that processing circuitry 120 may be compatible with future cellular protocols, such as the 5th generation (5G) wireless communication protocol presently under development. Processing circuitry 120 is configured to encode the position of ownship vehicle 100 in surveillance signals 174 based on a surveillance protocol such as ADS-B.

In some examples, processing circuitry 120 may be configured to determine that a quality level for cellular communication is less than a threshold quality level for cellular communication. The quality level for cellular communication may be based on the weather, the signal quality, and the number of cellular users in an area. Processing circuitry 120 may determine the quality level for cellular communication based on characteristics of received signals such as a received signal strength indicator (RSSI), a signal-to-noise ratio (SNR), signal-to-interference-plus-noise ratio (SINR), reference signal receiving power (RSRP), channel quality indicator (CQI), a bit error rate, and so on. Processing circuitry 120 may monitor the network-based signal strength for cellular communication and surveillance communication. In some examples, vehicle 180 or base station 190 may determine a quality level for cellular communication and communicate the quality level to vehicles in the area, such as ownship vehicle 100. Processing circuitry 120 may also determine the quality level based on a latency of cellular signals received from vehicle 180 or base station 190.

Processing circuitry 120 may be configured to cause surveillance transceiver 150 to transmit surveillance signals 174 indicating the position of ownship vehicle 100 in response to determining that the quality level for cellular communication is less than the threshold quality level for cellular communication. Processing circuitry 120 may also be configured to determine which form of communication to use based on whether ownship vehicle 100 is in an identified risk volume and/or whether the quality level for surveillance communication is less than a threshold level.

Positioning system 130 may include satellite navigation equipment such as a GNSS configured to receive positioning signals 170 from satellites and other transmitters. One example of a GNSS is a Global Positioning System (GPS). Positioning system 130 may be configured to deliver positioning signals 170 to processing circuitry 120, which may be configured to determine the position of ownship vehicle 100. Positioning system 130 may receive positioning signals 170 from at least four transmitters. Processing circuitry 120 may be configured to determine the position of ownship vehicle 100 based on the position and time of transmission of positioning signals 170.

Cellular transceiver 140 is configured to transmit cellular signals 172 indicating the position of ownship vehicle 100. Cellular transceiver 140 may operate in accordance with a cellular protocol such as GSM, UMTS, LTE, or IMT Advanced. For example, cellular transceiver 140 may transmit cellular signals 172 at approximately 1.8 gigahertz or approximately 2.1 gigahertz. Cellular transceiver 140 may include one or more antennas configured to transmit cellular signals 172 and possibly receive signals. In some examples, communication between cellular transceiver 140 and vehicle 180 may be direct (e.g., vehicle-to-vehicle communication)

or indirect (e.g., through base station 190). For direct communication, vehicle 180 includes a receiver configured to receive and decode cellular signals 172 transmitted by cellular transceiver 140 onboard ownship vehicle 100.

Surveillance transceiver 150 is configured to transmit surveillance signals 174 indicating the position of ownship vehicle 100. Although referred to as "transceivers," transceivers 140 and 150 may include only transmitter hardware in some examples, or may include receiver hardware in addition to the transmitter hardware. Surveillance transceiver 150 may include equipment for transmitting surveillance signals 174 and possibly for receiving surveillance signals. In some examples, surveillance signals 174 may include ADS-B signals or any other protocol for communicating the position of ownship vehicle 100. In some examples, surveillance transceiver 150 may include ADS-B in and out capabilities. Surveillance transceiver 150 may include a Mode-S transponder for transmitting surveillance signals 174 (e.g., ADS-B out). Surveillance transceiver 150 may transmit surveillance signals in digital format to indicate the position of ownship vehicle 100. Surveillance signals 174 may also include other information, such as the velocity, vehicle type, and destination of ownship vehicle 100. In some examples, surveillance transceiver 150 may also include a receiver configured to receive positioning signals.

Memory device 160 configured to store data relating to the positions of ownship vehicle 100 and vehicle 180. Memory device 160 may be configured to store system-control software, which processing circuitry 120 uses to coordinate the transmission of signals 172 and 174 by cellular transceiver 140 and surveillance transceiver 150. Memory device 160 may also be configured to store threshold levels for the quality of communication via cellular transceiver 140 and surveillance transceiver 150. Memory device 160 may be configured to store threshold latency levels and/or threshold interference levels for communication via cellular transceiver 140 and surveillance transceiver 150. Memory device 160 may store locations of high-traffic sites and sensitive sites and the threshold distances associated with the sites.

Power source 162 may supply electrical power to the components of system 110. Power source 162 may include a battery, an engine, an electrical generator, and/or any other device that supplies electrical power. In some examples, ownship vehicle 100 may include a single power source, such that power source 162 supplies electrical power to all components and device on ownship vehicle 100, including any propulsors of ownship vehicle 100. If system 110 is integrated into ownship vehicle 100 at the time of manufacture, power source 162 may be configured to supply power to ownship vehicle 100. Alternatively, ownship vehicle 100 may include more than one power source, such that power source 162 supplies electrical power to the components of system 110. If system 110 is built as an aftermarket system, system 110 may include a separate power source or a connection to receive power from an integrated power source of ownship vehicle 100.

Base station 190 may include antennas for receiving signals 172 and/or 174 from ownship vehicle 100. Base station 190 may be a building on land (e.g., a cellular tower or a rooftop cellular installation) or equipment on a seaborne vessel or satellite. Base station 190 may receive data indicating vehicle positions for ownship vehicle 100, vehicle 180, and/or other vehicles. Base station 190 may include a processor for performing operations on the position data. In some examples, base station 190 may compile and transmit traffic data and/or weather data to subscribing vehicles (e.g., Next Generation Air Transportation System (NextGen)).

In accordance with the techniques of this disclosure, processing circuitry 120 may be configured to selectively cause one or both of transceivers 140 and 150 to transmit signals 172 and 174 indicating the position of ownship vehicle 100. Processing circuitry 120 may select one form of communication when the other form of communication has low signal quality. Thus, system 110 may increase the probability that signals 172 or 174 are received by vehicle 180 or base station 190. Furthermore, in congested areas or sensitive locations, processing circuitry 120 may be configured to cause transceivers 140 and 150 to transmit signals 172 and 174 simultaneously in order to increase the probability that vehicle 180 or base station 190 receive signals 172 and 174.

In some examples, processing circuitry 120 may be configured to determine which of transceivers 140 and 150 to use based on the distance between ownship vehicle 100 and the nearest vehicle, as well as other traffic situation characteristics. In some examples, surveillance transceiver 150 may be configured to operate at higher power levels than cellular transceiver 140. Thus, processing circuitry 120 may be configured to select surveillance communication when the nearest vehicle is more than a threshold distance away from ownship vehicle 100. Surveillance transceiver 150 may be configured to cover a wider area, as compared to the coverage area of cellular transceiver 140, because the operating power level of surveillance transceiver 150.

System 110 may be useful for all types of vehicles, but especially uncrewed vehicles and autonomous vehicles that transmit signals 172 and 174 indicating the position of ownship vehicle 100. The law may proscribe that a UAV, for example, broadcast signals indicating the position of the UAV to other vehicles or to a base station. Thus, reliable broadcasting of the position of the UAV may increase the safety of operation of the other vehicles and increase the accuracy of position reporting by the base station.

Figure 2:
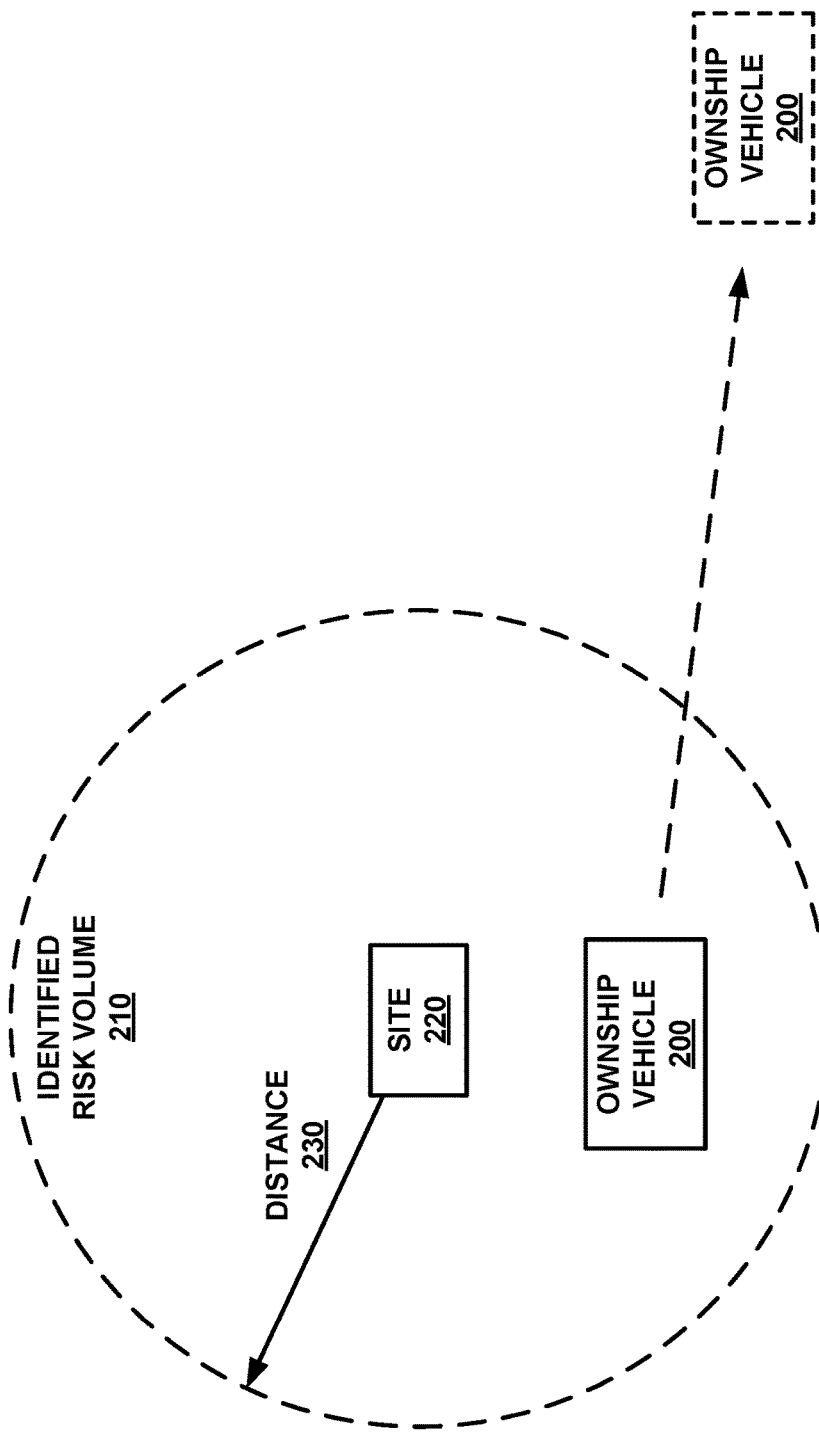
FIG. 2 is a conceptual block diagram of an ownship vehicle located in an identified risk volume, in accordance with some examples of this disclosure.

FIG. 2 is a conceptual block diagram of an ownship vehicle 200 located in an identified risk volume 210, in accordance with some examples of this disclosure. At a first instance, the processing circuitry onboard ownship vehicle 200 may determine that ownship vehicle 200 is located in identified risk volume 210. The processing circuitry may be configured to make this determination based on determining that ownship vehicle 200 is located less than distance 230 (e.g., a threshold distance) from site 220. The processing circuitry may be configured to determine the position of ownship vehicle 200 based on positioning signals received by ownship vehicle 200 and compare the position of ownship vehicle 200 to determine if ownship vehicle 200 is located in identified risk volume 210. In some examples, the threshold distance may be one hundred meters, five hundred meters, one kilometers, etc.

The processing circuitry of ownship vehicle 200 may be configured to cause a cellular transceiver and a surveillance transceiver to simultaneously transmit signals when ownship vehicle 200 is located in identified risk volume 210. Simultaneous transmission may increase the likelihood that other vehicle and base stations receive the signals transmitted by ownship vehicle 200, thereby increasing safety in a sensitive area such as identified risk volume 210.

At a second instance, the processing circuitry onboard ownship vehicle 200 may determine that ownship vehicle 200 is located outside of identified risk volume 210. The processing circuitry may be configured to make this determination based on determining that ownship vehicle 200 is located more than distance 230 from site 220. The processing circuitry may be configured to cause either the cellular transceiver or the surveillance transceiver to transmit signals in response to determining that ownship vehicle 200 is located outside of identified risk volume 210. Transmission by only one transceiver may reduce the interference for cellular signals and surveillance signals for ownship vehicle 200 and other vehicles, as compared to simultaneous transmission by both transceivers.

Site 220 may be an airport, a power station such as a power plant or a substation, a military facility or other governmental facility, a central urban area, or any other sensitive, secure, or high-traffic location. Site 220 may include a transmitter configured to notify vehicles of the location of site 220 and the boundaries of identified risk volume 210, such as distance 230. Alternatively or additionally, vehicles may store information relating to the location of site 220 and/or the boundaries of identified risk volume 210. Identified risk volume 210 may be defined as a spherical volume or semi-spherical volume centered on site 220. Identified risk volume 210 may be a cylindrical volume centered on site 220 with constant height and a horizontal radius. Identified risk volume 210 may be a cubic or rectangular volume centered on site 220.

Figure 3:
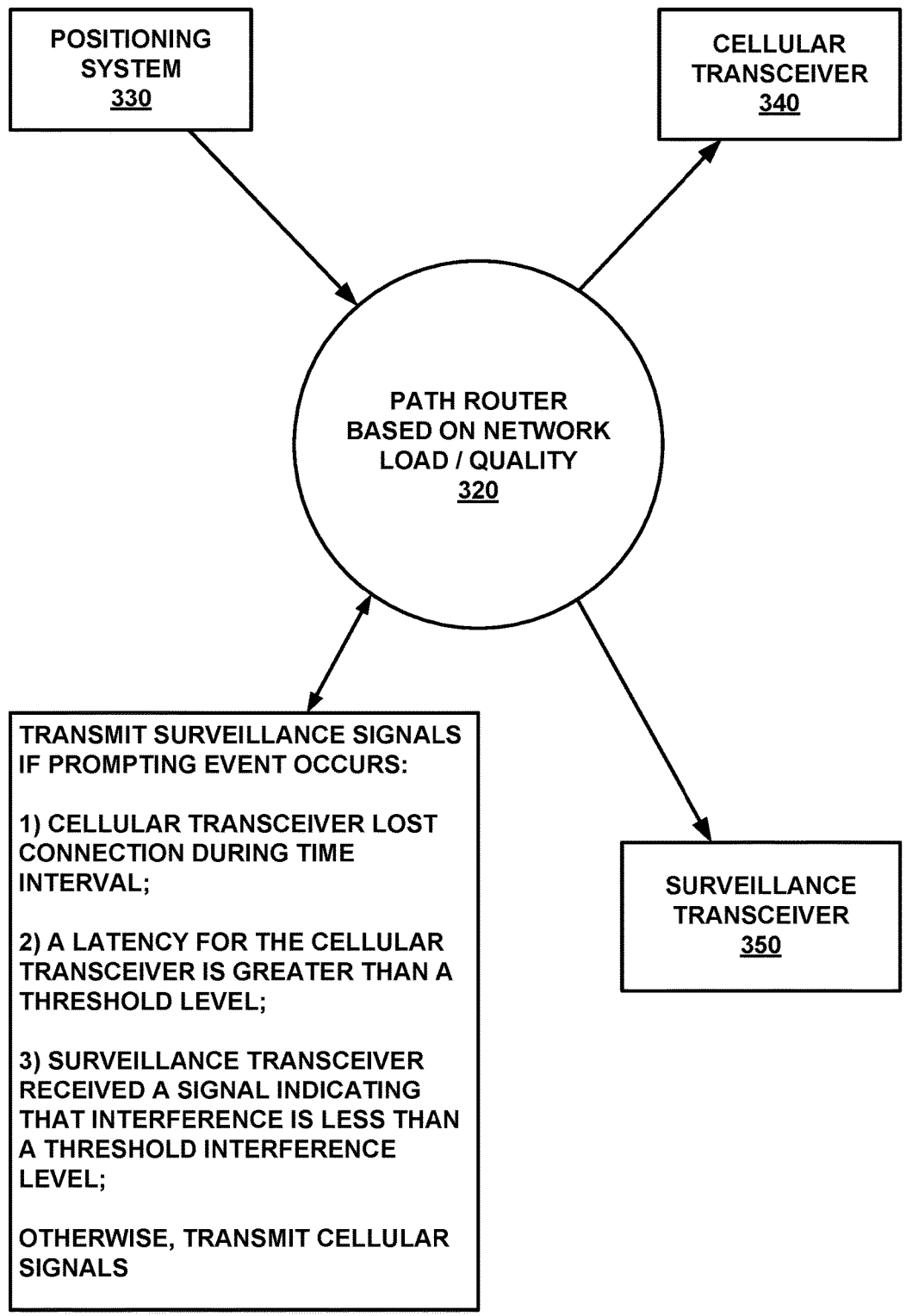
FIG. 3 is a conceptual block diagram of network load and quality-based adaptive position reporting, in accordance with some examples of this disclosure.

FIG. 3 is a conceptual block diagram of network load and quality-based adaptive position reporting, in accordance with some examples of this disclosure. Path router 320 may be configured to select one or both of transceivers 340 and 350 based on information received from positioning system 330. Path router 320 may also be configured to select a transceiver based on network load and/or quality level for each of transceivers 340 and 350. Cellular transceiver 340 may be configured to report the position of the ownship vehicle via a cellular network. Surveillance transceiver 350 may be configured to broadcast the position of the ownship vehicle using a protocol such as ADS-B at a frequency of approximately 1090 megahertz.

Path router 320 may implement network load and quality based adaptive vehicle position reporting. Path router 320 may adapt to the position of the ownship vehicle and the quality levels of cellular communication and surveillance communication. In some cases, surveillance channel congestions may occur if some surveillance messages are missing due to the massive vehicle numbers, and/or transmission by surveillance transceiver 350 may create large interference to aircrafts. Based on surveillance channel congestions, path router 320 could select the cellular network for transmission of the positioning information of the ownship vehicle to other vehicles and to a base station adaptively. If a cellular network is overloaded due to many cellular users and/or the ownship vehicle being out of cellular coverage, path router 320 may enable surveillance transceiver 350 for the position data handling. Assuming CSMA-CD (Carrier Sense Multiple Access with Collision Detection) has been implemented on the surveillance transceiver 350, which may include an ADS-B Out radio onboard a UAV, then path router 320 may select surveillance transceiver 350 to be used only when the detected interference level is small.

Path router 320 may be configured to cause cellular transceiver 340 to transmit cellular signals indicating a position of the ownship vehicle unless one of several prompting events occurs. If path router 320 determines that a prompting event occurs, path router 320 may be configured to cause surveillance transceiver 350 to transmit surveillance signals indicating a position of the ownship vehicle instead of or in addition to causing cellular transceiver 340 to transmit signals. Switching to surveillance transceiver 350 in response to determining the occurrence of a prompting event may avoid using cellular transceiver 340 in a congested or overloaded cellular area or when cellular interference is high.

A first possible prompting event is that cellular transceiver 340 lost a cellular connection during a time interval. For example, path router 320 may determine that cellular transceiver 340 lost a cellular connection if cellular transceiver 340 does not receive cellular signals from a base station or another vehicle during the previous five minutes or previous ten minutes. If cellular transceiver 340 is transmitting cellular signals to a base station or another vehicle, cellular transceiver 340 may receive cellular signals from the base station or the other vehicle at regular intervals, such as every one second or every five seconds. If cellular transceiver 340 does not receive cellular signals from the base station or the other vehicle for a certain time duration, path router 320 may be configured to that cellular transceiver 340 lost a connection. For the time interval after losing the connection, path router 320 may be configured to cause surveillance transceiver 350 to transmit signals indicating the position of the ownship vehicle.

A second possible prompting event is that cellular transceiver 340 experiences a latency that is greater than a threshold level. The latency for cellular transceiver 340 may be the time between a transmission by cellular transceiver 340 and the receipt of a responsive signal by cellular transceiver 340 from another vehicle or a base station. In some examples, the threshold level for the latency of cellular transceiver 340 may be one second or three seconds. If path router 320 determines that the latency for cellular communication exceeds the threshold level, path router 320 may be configured to cause surveillance transceiver 350 to transmit signals indicating the position of the ownship vehicle. Path router 320 may be configured to cause cellular transceiver 340 to continue to test the latency for cellular communication until the latency declines to less than the threshold level.

A third possible prompting event is that surveillance transceiver 350 received a signal from another vehicle or from a base station indicating that the interference for surveillance communication (i.e., surveillance signal interference) is less than a threshold level. Other vehicles or base stations may transmit signals indicating the interference level for surveillance communication to inform receivers, such as surveillance transceiver 350, of the interference level. Path router 320 may decide whether to use surveillance communication based on the received indicating the interference level. The received signal may indicate the interference level, and path router 320 may be configured to compare the indicated interference level to the threshold interference level.

Path router 320 may be configured to cause cellular transceiver 340 to transmit signals indicating the position of the ownship vehicle in response to determining that no prompting event has occurred. In the absence of a prompting event, path router 320 may be configured to cause cellular transceiver 340 to transmit signals as the default transceiver. In some examples, surveillance transceiver 350 may be the default transceiver for path router 320. However, if path router 320 determines that the ownship vehicle is located in an identified risk volume, path router 320 may be configured to cause both transceivers 340 and 350 to transmit signals indicating the position of the ownship vehicle.

Figure 4:
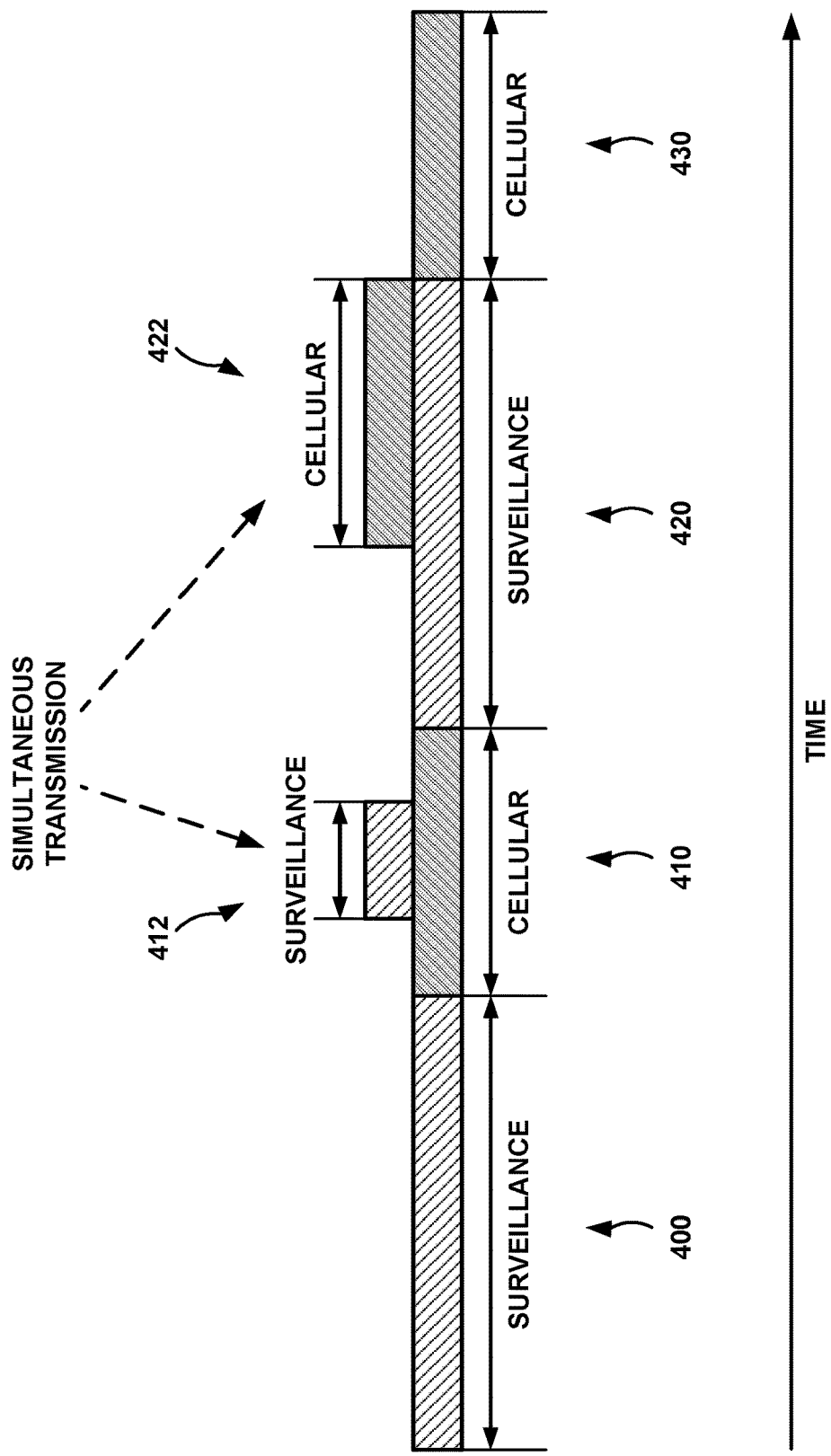
FIG. 4 is a diagram of simultaneous transmission in or near an identified risk volume, in accordance with some examples of this disclosure.

FIG. 4 is a diagram of simultaneous transmission in or near an identified risk volume, in accordance with some examples of this disclosure. In some examples, simultaneous transmission by the cellular transceiver and the surveillance transceiver may also occur in other situations when the ownship vehicle is located outside of an identified risk volume. For example, in low traffic situations, the ownship vehicle may implement simultaneous transmission because there is a lower risk of the transmitted signals interfering with transmissions by other vehicles, as compared to heavier-traffic situations. Additionally or alternatively, if the processing circuitry determines that the ownship vehicle has sufficient power supply, the processing circuitry may be configured to cause simultaneous transmission if power consumption is not a concern.

Time intervals 400, 410, 412, 420, 422, and 430 are example intervals during which a cellular transceiver and a surveillance transceiver transmit signals indicating the position of the ownship vehicle. During time intervals 400 and 420, processing circuitry causes the surveillance transceiver to transmit signals possibly in response to determining that a quality level for cellular communication is less than a threshold quality level or in response to determining that there is low interference for surveillance communication. During time intervals 410 and 430, processing circuitry causes the cellular transceiver to transmit signals possibly in response to not determining that a quality level for cellular communication is less than a threshold quality level.

During time intervals 412 and 422, processing circuitry causes the cellular transceiver and the surveillance transceiver to simultaneously transmit signals possibly in response to determining that the ownship vehicle is located in an identified risk volume. In some examples, simultaneous transmission may include interleaving, such that there is some overlap or no overlap between the cellular signals and the surveillance signals. The identified risk volume may be centered on a site such as an airport or other sensitive site or high-traffic site.

In some special situations, the processing circuitry can enable the simultaneous surveillance and cellular transmission for high reliability and cross-verification. The possible scenarios for the simultaneous surveillance and cellular transmission could be a high-risk area, e.g., the area near to an airport or a power station. Since the mixed technology will be used for simultaneous transmission, the vehicle position information coding and transmission will follow the respective protocols of cellular signals and surveillance signals when using each specific technology. Thus, one specific function (either onboard the ownship vehicle or at a base station) may be designed to translate the different position formats to a common position format. The specific function may be embedded or programmed in processing circuitry that receives signals from a cellular transceiver and a surveillance transceiver.

Passive ground radar can be part of a UTM ground monitoring system, and the sensed UAV location information from the passive ground radar can be compared with the received position information at the UTM ground station (from surveillance signals or cellular signals) for verification purposes. If the ground radar found flying UAV's in a specific area, but the surveillance or cellular information at the UTM ground station did not include a record of the flying UAV's, then there may be illegal UAV flying in the specific area. The UTM ground station may need to take quick action to identify the illegal flying UAV's. If the surveillance or cellular information at the UTM ground station has the specific position record of UAV's, but ground radar didn't find the UAV's in the same area, then position records might be due to false or abusive broadcasting. The UTM ground station may need to take quick action to check if the position records include a ground radar error or an error due to a UAV illegally reporting a position.

The processing circuitry onboard the ownship vehicle may implement database-based transmission selection. The ownship vehicle, such as a small UAV, can record and maintain two databases: one database for the coverage of the cellular network, and the other database for the coverage of the surveillance station(s). Based on the real-time location of the ownship vehicle, then the processing circuitry can determine if the specific technology is accessible. Thus, the processing circuitry can automatically select and switch the different technology based on the availability judged by the processing circuitry from the onboard database.

Figure 5:
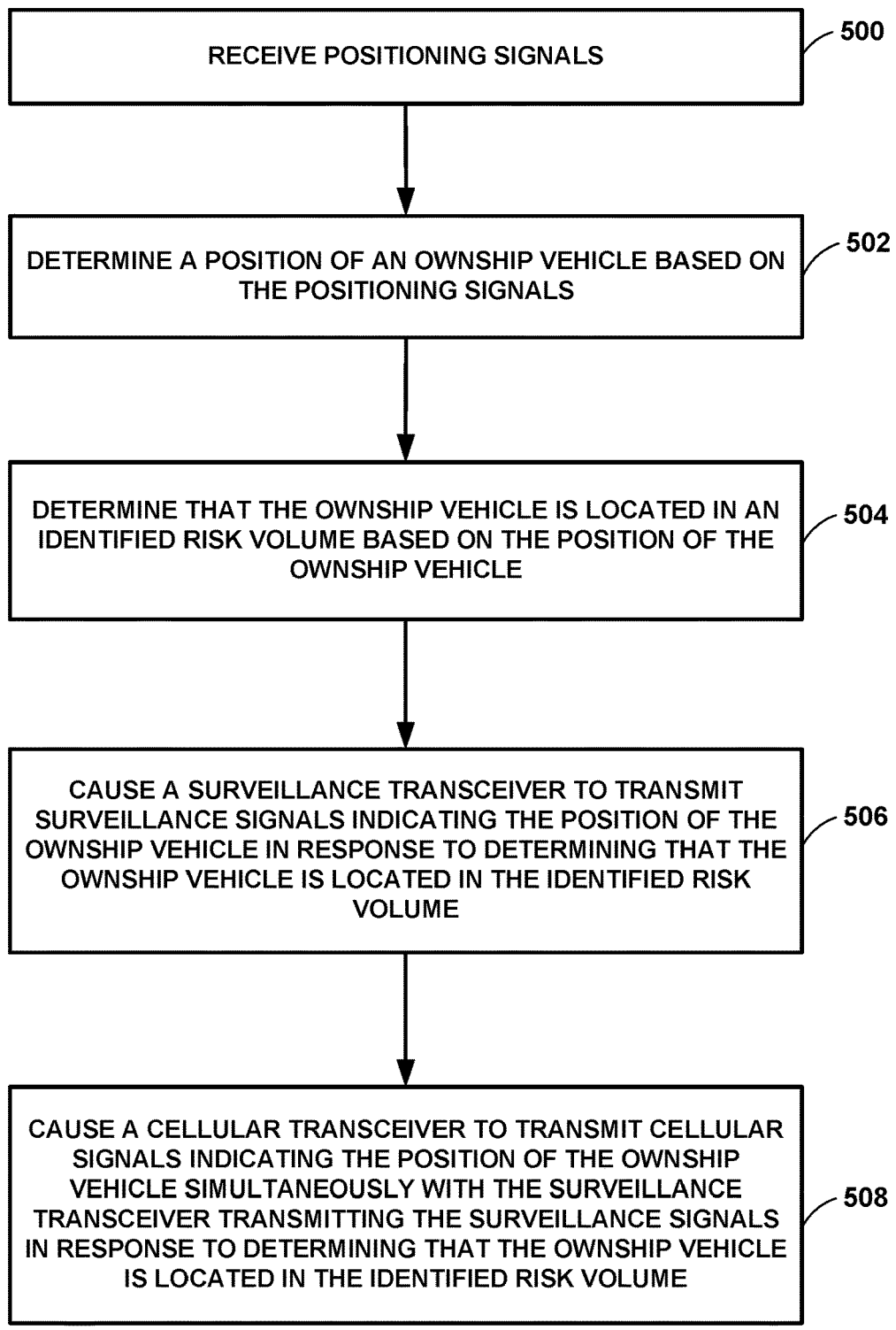
FIG. 5 shows a flowchart for example techniques for transmitting a position of an ownship vehicle, in accordance with some examples of this disclosure.
Figure 6:
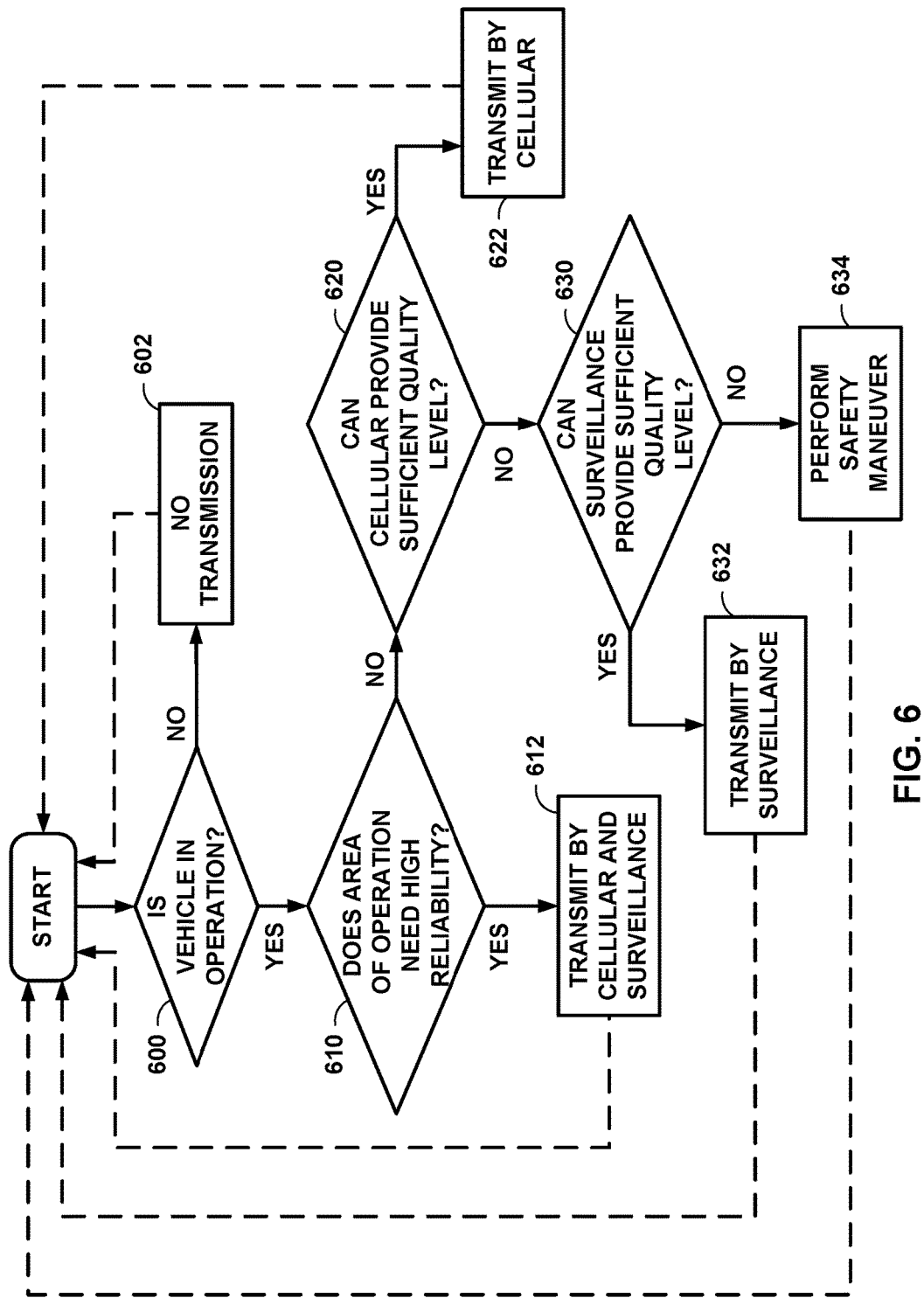
FIG. 6 shows a flowchart for example techniques for adaptive mode selection, in accordance with some examples of this disclosure.

FIG. 5 shows a flowchart for example techniques for transmitting a position of an ownship vehicle, in accordance with some examples of this disclosure. The techniques of FIGS. 5 and 6 are described with reference to system 110 of FIG. 1, including processing circuitry 120, positioning system 130, cellular transceiver 140, and surveillance transceiver 150, although other components may perform similar techniques.

In the example of FIG. 5, positioning system 130 receives positioning signals 170 (500). Positioning system 130 may receive positioning signals 170 from at least four transmitters. Positioning signals 170 may include GNSS signals such as GPS signals. In the example of FIG. 5, processing circuitry 120 then determines a position of ownship vehicle 100 based on positioning signals 170 (502). Processing circuitry 120 may be configured to encode the position of ownship vehicle 100 using a cellular communication protocol and/or a surveillance communication protocol.

In the example of FIG. 5, processing circuitry 120 determines that ownship vehicle 100 is located in an identified risk volume based on the position of ownship vehicle 100 (504). The identified risk volume may be centered on a site such as an airport or a power station. Processing circuitry 120 may be configured to determine the distance between the position of ownship vehicle 100 and the site and to determine that the distance is less than a threshold distance.

In the example of FIG. 5, processing circuitry 120 cause surveillance transceiver 150 to transmit surveillance signals 174 indicating the position of ownship vehicle 100 in response to determining that ownship vehicle 100 is located in the identified risk volume (506). Processing circuitry 120 may be configured to encode information indicating the position of ownship vehicle 100, along with the velocity and other information about ownship vehicle 100, using a surveillance communication protocol. Processing circuitry 120 may be configured to cause surveillance transceiver 150 to transmit the encoded signals.

In the example of FIG. 5, processing circuitry 120 cause cellular transceiver 140 to transmit cellular signals 172 indicating the position of ownship vehicle 100 simultaneously with surveillance transceiver 150 transmitting surveillance signals 174 in response to determining that ownship vehicle 100 is located in the identified risk volume (508). Processing circuitry 120 may be configured to encode information indicating the position of ownship vehicle 100 using a cellular communication protocol. Processing circuitry 120 may be configured to cause transceivers 140 and 150 to simultaneously transmit signals 172 or 174. In some examples, transceivers 140 and 150 may alternate transmitting signals 172 or 174, so that there is some or no overlap between the active durations of signals 172 or 174. There may be a time interval between the active durations of signals 172 or 174 when neither transceiver 140 nor transceiver 150 is transmitting a signal 172 or 174. In some examples, transceivers 140 and 150 may be configured to interleave signals 172 and 174.

FIG. 6 shows a flowchart for example techniques for adaptive mode selection, in accordance with some examples of this disclosure. FIG. 6 shows an example implementation of adaptive transmission mode selection. In the example of FIG. 6, processing circuitry 120 determines whether ownship vehicle 100 is in operation (600). "Operation" may include ownship vehicle 100 being powered on, moving, and/or taking off and flying (e.g., for an aerial vehicle). If processing circuitry 120 determines that ownship vehicle 100 is not in operation, processing circuitry 120 does not cause transceiver 140 or 150 to transmit signals 172 or 174 indicating the position of ownship vehicle 100 (602).

In the example of a small UAV, the embedded system of the small UAV determines if the UAV has taken off and is flying in a special or specific area which needs the high position reliability. If processing circuitry 120 determines that ownship vehicle 100 is in operation, processing circuitry 120 determines whether the area of operation needs high reliability (610). An identified risk volume may be an area of operation that needs high reliability. If processing circuitry 120 determines that the area of operation needs high reliability, processing circuitry 120 causes transceivers 140 and 150 to transmit signals 172 and 174 indicating the position of ownship vehicle 100 (612). Processing circuitry 120 may start to configure and report position via both cellular and surveillance technology until ownship vehicle 100 (e.g., the small UAV) is flying out of the special area.

If processing circuitry 120 determines that the area of operation does not need high reliability, processing circuitry 120 determines whether cellular communication can provide a sufficient quality level (620). In some examples, system 110 of a small UAV may judge whether cellular technology can provide a sufficient quality for position reporting. Processing circuitry 120 may be configured to determine whether cellular communication can provide a sufficient quality level by comparing the quality level for cellular communication to a threshold quality level. In some examples, the determination of the quality level for cellular communication may be based on the latency of cellular communication, any recently lost cellular connections, and/or the amount of interference for cellular communication. Threshold quality level information, such as threshold latency levels and threshold interference levels, may be stored to memory device 160.

If processing circuitry 120 determines that cellular communication can provide a sufficient quality level, processing circuitry 120 causes cellular transceiver 140 to transmit cellular signals 172 indicating the position of ownship vehicle 100 (622). Processing circuitry 120 will then configure the cellular technology for position reporting. If processing circuitry 120 determines that cellular communication will not provide a sufficient quality level, processing circuitry 120 determines whether surveillance communication can provide a sufficient quality level (630). In some examples, system 110 of the small UAV will judge whether surveillance technology (e.g., ADS-B) can provide a sufficient quality for position reporting. If processing circuitry 120 determines that surveillance communication can provide a sufficient quality level, processing circuitry 120 causes surveillance transceiver 150 to transmit surveillance signals 174 indicating the position of ownship vehicle 100 (632). Processing circuitry 120 will then configure the surveillance technology for position reporting.

If processing circuitry 120 determines that both cellular communication and surveillance communication cannot provide a sufficient quality level, processing circuitry 120 causes ownship vehicle 100 to perform a safety maneuver (634). If both technology cannot work properly, then the small UAV will land on the ground immediately and report a system error to base station 190 or the UAV controller. The safety maneuver may be landing an aerial vehicle, pulling over and stopping a land vehicle, docking a marine vehicle, and/or maneuver any vehicle from an area of higher traffic to an area of lower traffic. Processing circuitry 120 may be configured to cause the vehicle control system of ownship vehicle 100 to cause, for example, a motor or engine of ownship vehicle 100 to generate thrust or torque to move ownship vehicle 100 to perform the safety maneuver.

The dashed lines of FIG. 6 represent that the processing circuitry may be configured to perform the techniques continuously. The processing circuitry may be configured to perform the techniques of FIG. 6, continuously, semi-continuously, or one time in response to a specific event. The processing circuitry may be configured to perform the techniques of FIG. 6 at a regular interval to check whether any of the input variables (e.g., position and quality level) have changed since a previous iteration.

The following examples may illustrate one or more of the techniques of this disclosure.

Example 1

A system is for transmitting a location of an ownship vehicle, wherein the system is configured to be mounted on the ownship vehicle, and the system includes a positioning system configured to receive positioning signals. The system also includes a cellular transceiver, a surveillance transceiver, and processing circuitry configured to determine a position of the ownship vehicle based on the positioning signals. The processing circuitry is further configured to determine that the ownship vehicle is located in an identified risk volume based on the position of the ownship vehicle and cause the surveillance transceiver to transmit surveillance signals indicating the position of the ownship vehicle in response to determining that the ownship vehicle is located in the identified risk volume and cause the cellular transceiver to transmit cellular signals indicating the position of the ownship vehicle simultaneously with the surveillance transceiver transmitting the surveillance signals in response to determining that the ownship vehicle is located in the identified risk volume.

Example 2

The system of example 1, wherein the processing circuitry is configured to determine that the ownship vehicle is located in the identified risk volume by at least determining that the ownship vehicle is located less than a threshold distance from a site. The processing circuitry is configured to cause the surveillance transceiver to transmit the surveillance signals indicating the position of the ownship vehicle in response to determining that the ownship vehicle is located less than the threshold distance from the site. The processing circuitry is configured to cause the cellular transceiver to transmit the cellular signals indicating the position of the ownship vehicle simultaneously with the surveillance transceiver transmitting the surveillance signals in response to determining that the ownship vehicle is located less than the threshold distance from the site.

Example 3

The system of examples 1-2 or any combination thereof, wherein the processing circuitry is further configured to determine that the ownship vehicle is located outside of the identified risk volume based on the position of the ownship vehicle. The processing circuitry is also configured to determine that the cellular transceiver lost a cellular connection during a time interval. The processing circuitry is configured to cause the surveillance transceiver to transmit the surveillance signals indicating the position of the ownship vehicle in response to determining that the ownship vehicle is located outside of the identified risk volume and determining that the cellular transceiver lost the cellular connection during the time interval.

Example 4

The system of examples 1-3 or any combination thereof, wherein the processing circuitry is further configured to determine that the ownship vehicle is located outside of the identified risk volume based on the position of the ownship vehicle. The processing circuitry is also configured to determine that a latency for the cellular transceiver is greater than a threshold latency level. The processing circuitry is configured to cause the surveillance transceiver to transmit the surveillance signals indicating the position of the ownship vehicle in response to determining that the ownship vehicle is located outside of the identified risk volume and determining that the latency for the cellular transceiver is greater than the threshold latency level.

Example 5

The system of examples 1-4 or any combination thereof, wherein the processing circuitry is further configured to determine that the ownship vehicle is located outside of the identified risk volume based on the position of the ownship vehicle. The processing circuitry is also configured to determine that the surveillance transceiver received a signal indicating that surveillance signal interference is less than a threshold interference level. The processing circuitry is configured to cause the surveillance transceiver to transmit the surveillance signals indicating the position of the ownship vehicle in response to determining that the ownship vehicle is located outside of the identified risk volume and determining that the surveillance transceiver received the signal indicating that the surveillance signal interference is less than the threshold interference level.

Example 6

The system of examples 1-5 or any combination thereof, wherein the processing circuitry is further configured to determine that the ownship vehicle is located outside of the identified risk volume based on the position of the ownship vehicle. The processing circuitry is also configured to determine that the cellular transceiver did not lose a cellular connection during a time interval, determine that a latency for the cellular transceiver is not greater than a threshold latency level, and determine that surveillance signal interference is not greater than a threshold interference level. The processing circuitry is configured to cause the cellular transceiver to transmit the cellular signals indicating the position of the ownship vehicle in response to determining that the ownship vehicle is located outside of the identified risk volume, determining that the cellular transceiver did not lose the cellular connection during the time interval, determining that the latency for the cellular transceiver is not greater than the threshold latency level, and determining that the surveillance signal interference is greater than the threshold interference level.

Example 7

The system of examples 1-6 or any combination thereof, wherein the processing circuitry is further configured to determine that a quality level for cellular communication is less than a threshold quality level for cellular communication. The processing circuitry is also configured to determine whether a quality level for surveillance communication is less than a threshold quality level for surveillance communication. The processing circuitry is configured to cause the ownship vehicle to perform a safety maneuver in response to determining that the quality level for cellular communication is less than the threshold quality level for cellular communication and determining that the quality level for surveillance communication is less than the threshold quality level for surveillance communication.

Example 8

The system of examples 1-7 or any combination thereof, wherein the processing circuitry is further configured to determine that the ownship vehicle is located outside of the identified risk volume based on the position of the ownship vehicle. The processing circuitry is also configured to determine that a quality level for cellular communication is greater than a threshold quality level for cellular communication and determine that a quality level for surveillance communication is greater than a threshold quality level for surveillance communication. The processing circuitry is configured to cause the cellular transceiver to transmit the cellular signals indicating the position of the ownship vehicle in response to determining that the ownship vehicle is located outside of the identified risk volume, determining that the quality level for cellular communication is greater than the threshold quality level for cellular communication, and determining that the quality level for surveillance communication is greater than the threshold quality level for surveillance communication.

Example 9

The system of examples 1-8 or any combination thereof, wherein the system is configured to be mounted on an unmanned aerial ownship vehicle.

Example 10

A method is for transmitting a location of an ownship vehicle includes receiving positioning signals and determining a position of the ownship vehicle based on the positioning signals. The method also includes determining that, in a first instance, the ownship vehicle is located in an identified risk volume based on the position of the ownship vehicle. The method further includes cause a surveillance transceiver to transmit surveillance signals indicating the position of the ownship vehicle in response to determining that the ownship vehicle is located in the identified risk volume. The method includes cause a cellular transceiver to transmit cellular signals indicating the position of the ownship vehicle simultaneously with the surveillance transceiver transmitting the surveillance signals in response to determining that the ownship vehicle is located in the identified risk volume.

Example 11

The method of example 10, wherein determining that the ownship vehicle is located in the identified risk volume includes determining that the ownship vehicle is located less than a threshold distance from a site. The step of causing the surveillance transceiver to transmit the surveillance signals indicating the position of the ownship vehicle is further in response to determining that the ownship vehicle is located less than the threshold distance from the site. The step of causing the cellular transceiver to transmit the cellular signals indicating the position of the ownship vehicle simultaneously with the surveillance transceiver transmitting the surveillance signals is further in response to determining that the ownship vehicle is located less than the threshold distance from the site.

Example 12

The method of examples 10-11 or any combination thereof, further including determining that, in a second instance, the ownship vehicle is located outside of the identified risk volume based on the position of the ownship vehicle and determining that the cellular transceiver lost a cellular connection during a time interval. The method further includes causing the surveillance transceiver to transmit the surveillance signals indicating the position of the ownship vehicle in response to determining that the ownship vehicle is located outside of the identified risk volume and determining that the cellular transceiver lost the cellular connection during the time interval.

Example 13

The method of examples 10-12 or any combination thereof, further including determining that, in a second instance, the ownship vehicle is located outside of the identified risk volume based on the position of the ownship vehicle and determining that a latency for the cellular transceiver is greater than a threshold latency level. The method further includes causing the surveillance transceiver to transmit the surveillance signals indicating the position of the ownship vehicle in response to determining that the ownship vehicle is located outside of the identified risk volume and determining that the latency for the cellular transceiver is greater than the threshold latency level.

Example 14

The method of examples 10-13 or any combination thereof, further including determining that, in a second instance, the ownship vehicle is located outside of the identified risk volume based on the position of the ownship vehicle. The method further includes determining that the surveillance transceiver received a signal indicating that surveillance signal interference is less than a threshold interference level. The method also includes causing the surveillance transceiver to transmit the surveillance signals indicating the position of the ownship vehicle in response to determining that the ownship vehicle is located outside of the identified risk volume and determining that the surveillance transceiver received the signal indicating that the surveillance signal interference is less than the threshold interference level.

Example 15

The method of examples 10-14 or any combination thereof, further including determining that, in a second instance, the ownship vehicle is located outside of the identified risk volume based on the position of the ownship vehicle. The method further includes determining that the cellular transceiver did not lose a cellular connection during a time interval and determining that a latency for the cellular transceiver is not greater than a threshold latency level. The method also includes determining that surveillance signal interference is not greater than a threshold interference level. The method includes causing the cellular transceiver to transmit the cellular signals indicating the position of the ownship vehicle in response to determining that the ownship vehicle is located outside of the identified risk volume, determining that the cellular transceiver did not lose the cellular connection during the time interval, determining that the latency for the cellular transceiver is not greater than the threshold latency level, and determining that the surveillance signal interference is greater than the threshold interference level.

Example 16

The method of examples 10-15 or any combination thereof, further including determining that a quality level for cellular communication is less than a threshold quality level for cellular communication and determining whether a quality level for surveillance communication is less than a threshold quality level for surveillance communication. The method also includes causing the ownship vehicle to perform a safety maneuver in response to determining that the quality level for cellular communication is less than the threshold quality level for cellular communication and determining that the quality level for surveillance communication is less than the threshold quality level for surveillance communication.

Example 17

The method of examples 10-16 or any combination thereof, further including determining that, in a second instance, the ownship vehicle is located outside of the identified risk volume based on the position of the ownship vehicle. The method also includes determining that a quality level for cellular communication is greater than a threshold quality level for cellular communication and determining that a quality level for surveillance communication is greater than a threshold quality level for surveillance communication. The method further includes causing the cellular transceiver to transmit the cellular signals indicating the position of the ownship vehicle in response to determining that the ownship vehicle is located outside of the identified risk volume, determining that the quality level for cellular communication is greater than the threshold quality level for cellular communication, and determining that the quality level for surveillance communication is greater than the threshold quality level for surveillance communication.

Example 18

A system is for transmitting a location of an ownship vehicle, wherein the system is configured to be mounted on the ownship vehicle, and the system includes a positioning system configured to receive positioning signals, a cellular transceiver, and a surveillance transceiver. The system also includes processing circuitry configured to determine a position of the ownship vehicle based on the positioning signals and determine that a quality level for cellular communication is less than a threshold quality level for cellular communication. The processing circuitry is further configured to cause the surveillance transceiver to transmit surveillance signals indicating the position of the ownship vehicle in response to determining that the quality level for cellular communication is less than the threshold quality level for cellular communication.

Example 19

The system of example 18, wherein the processing circuitry is configured to determine that the quality level for cellular communication is less than the threshold quality level for cellular communication by at least determining that the cellular transceiver lost a cellular connection during a time interval. The processing circuitry is configured to cause the surveillance transceiver to transmit the surveillance signals indicating the position of the ownship vehicle in response to determining that the cellular transceiver lost the cellular connection during the time interval.

Example 20

The system of examples 18-19 or any combination thereof, wherein the processing circuitry is configured to determine that the quality level for cellular communication is less than the threshold quality level for cellular communication by at least determining that a latency for the cellular transceiver is greater than a threshold latency level. The processing circuitry is configured to cause the surveillance transceiver to transmit the surveillance signals indicating the position of the ownship vehicle in response to determining that the latency for the cellular transceiver is greater than the threshold latency level.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

System 110 may include one or more memory devices, such as memory device 160, that include any volatile or non-volatile media, such as a RAM, ROM, non-volatile RAM (NVRAM), electrically erasable programmable ROM (EEPROM), flash memory, and the like. The one or more memory devices may store computer-readable instructions that, when executed by processing circuitry, cause the processing circuitry to implement the techniques attributed herein to processing circuitry.

Elements of processing circuitry 120 and/or memory device 160 may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of processing circuitry 120 and/or memory device 160 as in any of the examples herein may be implemented as a device, a system, an apparatus, and may embody or implement a method of determining an estimated altitude of a melting layer.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

In some examples, system 110 may include separate processing circuitry for positioning system 130, cellular transceiver 140, and/or surveillance transceiver 150. Even if one or more of the devices of system 110 have separate processing circuitry, a single control unit of processing circuitry 120 may be configured to control the operations of all of the devices of system 110. Processing circuitry 120 may be configured to receive information from positioning system 130 and use the information to control transceivers 140 and 150.

A "vehicle" may be an aircraft, a land vehicle such as an automobile, or a water vehicle such as a ship or a submarine. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery drone or other craft).

Various illustrative aspects of the disclosure are described above. These and other aspects are within the scope of the following claims.

What is claimed is:

1. A system for transmitting a position of an unmanned aerial ownship vehicle, wherein the system is configured to be mounted on the unmanned aerial ownship vehicle, the system comprising:
a positioning system configured to receive positioning signals;
a cellular transceiver;
a surveillance transceiver; and
processing circuitry configured to:
determine the position of the unmanned aerial ownship vehicle based on the positioning signals;
determine that the unmanned aerial ownship vehicle is located in an identified risk volume based on the position of the unmanned aerial ownship vehicle;
cause the surveillance transceiver to transmit surveillance signals indicating the position of the unmanned aerial ownship vehicle in response to determining that the unmanned aerial ownship vehicle is located in the identified risk volume; and
cause the cellular transceiver to transmit cellular signals indicating the position of the unmanned aerial ownship vehicle simultaneously with the surveillance transceiver transmitting the surveillance signals in response to determining that the unmanned aerial ownship vehicle is located in the identified risk volume.

2. The system of claim 1,
wherein the processing circuitry is configured to determine that the unmanned aerial ownship vehicle is located in the identified risk volume by at least determining that the unmanned aerial ownship vehicle is located less than a threshold distance from a site,
wherein the processing circuitry is configured to cause the surveillance transceiver to transmit the surveillance signals indicating the position of the unmanned aerial ownship vehicle in response to determining that the unmanned aerial ownship vehicle is located less than the threshold distance from the site, and
wherein the processing circuitry is configured to cause the cellular transceiver to transmit the cellular signals indicating the position of the unmanned aerial ownship vehicle simultaneously with the surveillance transceiver transmitting the surveillance signals in response to determining that the unmanned aerial ownship vehicle is located less than the threshold distance from the site.

3. The system of claim 1, wherein the processing circuitry is further configured to:
determine that the unmanned aerial ownship vehicle is located outside of the identified risk volume based on the position of the unmanned aerial ownship vehicle;
determine that the cellular transceiver lost a cellular connection during a time interval; and
cause the surveillance transceiver to transmit the surveillance signals indicating the position of the unmanned aerial ownship vehicle in response to:
determining that the unmanned aerial ownship vehicle is located outside of the identified risk volume; and
determining that the cellular transceiver lost the cellular connection during the time interval.

4. The system of claim 1, wherein the processing circuitry is further configured to:
determine that the unmanned aerial ownship vehicle is located outside of the identified risk volume based on the position of the unmanned aerial ownship vehicle;
determine that a latency for the cellular transceiver is greater than a threshold latency level; and
cause the surveillance transceiver to transmit the surveillance signals indicating the position of the unmanned aerial ownship vehicle in response to:
determining that the unmanned aerial ownship vehicle is located outside of the identified risk volume; and
determining that the latency for the cellular transceiver is greater than the threshold latency level.

5. The system of claim 1, wherein the processing circuitry is further configured to:
determine that the unmanned aerial ownship vehicle is located outside of the identified risk volume based on the position of the unmanned aerial ownship vehicle;
determine that the surveillance transceiver received a signal indicating that surveillance signal interference is less than a threshold interference level; and
cause the surveillance transceiver to transmit the surveillance signals indicating the position of the unmanned aerial ownship vehicle in response to:
determining that the unmanned aerial ownship vehicle is located outside of the identified risk volume; and
determining that the surveillance transceiver received the signal indicating that the surveillance signal interference is less than the threshold interference level.

6. The system of claim 1, wherein the processing circuitry is further configured to:
determine that the unmanned aerial ownship vehicle is located outside of the identified risk volume based on the position of the unmanned aerial ownship vehicle;
determine that the cellular transceiver did not lose a cellular connection during a time interval;
determine that a latency for the cellular transceiver is not greater than a threshold latency level;
determine that surveillance signal interference is not greater than a threshold interference level; and
cause the cellular transceiver to transmit the cellular signals indicating the position of the unmanned aerial ownship vehicle in response to:
determining that the unmanned aerial ownship vehicle is located outside of the identified risk volume;
determining that the cellular transceiver did not lose the cellular connection during the time interval;
determining that the latency for the cellular transceiver is not greater than the threshold latency level; and
determining that the surveillance signal interference is greater than the threshold interference level.

7. The system of claim 1, wherein the processing circuitry is further configured to:
determine that a quality level for cellular communication is less than a threshold quality level for cellular communication;
determine whether a quality level for surveillance communication is less than a threshold quality level for surveillance communication; and
cause the unmanned aerial ownship vehicle to perform a safety maneuver in response to:
determining that the quality level for cellular communication is less than the threshold quality level for cellular communication; and
determining that the quality level for surveillance communication is less than the threshold quality level for surveillance communication.

8. The system of claim 1, wherein the processing circuitry is further configured to:
determine that the unmanned aerial ownship vehicle is located outside of the identified risk volume based on the position of the unmanned aerial ownship vehicle;
determine that a quality level for cellular communication is greater than a threshold quality level for cellular communication;
determine that a quality level for surveillance communication is greater than a threshold quality level for surveillance communication; and
cause the cellular transceiver to transmit the cellular signals indicating the position of the unmanned aerial ownship vehicle in response to:
determining that the unmanned aerial ownship vehicle is located outside of the identified risk volume;
determining that the quality level for cellular communication is greater than the threshold quality level for cellular communication; and
determining that the quality level for surveillance communication is greater than the threshold quality level for surveillance communication.

9. A method for transmitting a position of an unmanned aerial ownship vehicle, the method comprising:
receiving positioning signals;

determining the position of the unmanned aerial ownship vehicle based on the positioning signals;

determining that, in a first instance, the unmanned aerial ownship vehicle is located in an identified risk volume based on the position of the unmanned aerial ownship vehicle;

cause a surveillance transceiver to transmit surveillance signals indicating the position of the unmanned aerial ownship vehicle in response to determining that the unmanned aerial ownship vehicle is located in the identified risk volume; and cause a cellular transceiver to transmit cellular signals indicating the position of the unmanned aerial ownship vehicle simultaneously with the surveillance transceiver transmitting the surveillance signals in response to determining that the unmanned aerial ownship vehicle is located in the identified risk volume.

10. The method of claim 9, wherein determining that the unmanned aerial ownship vehicle is located in the identified risk volume comprises determining that the unmanned aerial ownship vehicle is located less than a threshold distance from a site, wherein causing the surveillance transceiver to transmit the surveillance signals indicating the position of the unmanned aerial ownship vehicle is further in response to determining that the unmanned aerial ownship vehicle is located less than the threshold distance from the site, and wherein causing the cellular transceiver to transmit the cellular signals indicating the position of the unmanned aerial ownship vehicle simultaneously with the surveillance transceiver transmitting the surveillance signals is further in response to determining that the unmanned aerial ownship vehicle is located less than the threshold distance from the site.

11. The method of claim 9, further comprising:
determining that, in a second instance, the unmanned aerial ownship vehicle is located outside of the identified risk volume based on the position of the unmanned aerial ownship vehicle;
determining that the cellular transceiver lost a cellular connection during a time interval; and
causing the surveillance transceiver to transmit the surveillance signals indicating the position of the unmanned aerial ownship vehicle in response to:
determining that the unmanned aerial ownship vehicle is located outside of the identified risk volume; and
determining that the cellular transceiver lost the cellular connection during the time interval.

12. The method of claim 9, further comprising:
determining that, in a second instance, the unmanned aerial ownship vehicle is located outside of the identified risk volume based on the position of the unmanned aerial ownship vehicle;
determining that a latency for the cellular transceiver is greater than a threshold latency level; and
causing the surveillance transceiver to transmit the surveillance signals indicating the position of the unmanned aerial ownship vehicle in response to:
determining that the unmanned aerial ownship vehicle is located outside of the identified risk volume; and
determining that the latency for the cellular transceiver is greater than the threshold latency level.

13. The method of claim 9, further comprising:
determining that, in a second instance, the unmanned aerial ownship vehicle is located outside of the identified risk volume based on the position of the unmanned aerial ownship vehicle;
determining that the surveillance transceiver received a signal indicating that surveillance signal interference is less than a threshold interference level; and
causing the surveillance transceiver to transmit the surveillance signals indicating the position of the unmanned aerial ownship vehicle in response to:
determining that the unmanned aerial ownship vehicle is located outside of the identified risk volume; and
determining that the surveillance transceiver received the signal indicating that the surveillance signal interference is less than the threshold interference level.

14. The method of claim 9, further comprising:
determining that, in a second instance, the unmanned aerial ownship vehicle is located outside of the identified risk volume based on the position of the unmanned aerial ownship vehicle;
determining that the cellular transceiver did not lose a cellular connection during a time interval;
determining that a latency for the cellular transceiver is not greater than a threshold latency level;
determining that surveillance signal interference is not greater than a threshold interference level; and
causing the cellular transceiver to transmit the cellular signals indicating the position of the unmanned aerial ownship vehicle in response to:
determining that the unmanned aerial ownship vehicle is located outside of the identified risk volume;
determining that the cellular transceiver did not lose the cellular connection during the time interval;
determining that the latency for the cellular transceiver is not greater than the threshold latency level; and
determining that the surveillance signal interference is greater than the threshold interference level.

15. The method of claim 9, further comprising:
determining that a quality level for cellular communication is less than a threshold quality level for cellular communication;
determining whether a quality level for surveillance communication is less than a threshold quality level for surveillance communication; and
causing the unmanned aerial ownship vehicle to perform a safety maneuver in response to:
determining that the quality level for cellular communication is less than the threshold quality level for cellular communication; and
determining that the quality level for surveillance communication is less than the threshold quality level for surveillance communication.

16. The method of claim 9, further comprising:
determining that, in a second instance, the unmanned aerial ownship vehicle is located outside of the identified risk volume based on the position of the unmanned aerial ownship vehicle;
determining that a quality level for cellular communication is greater than a threshold quality level for cellular communication;
determining that a quality level for surveillance communication is greater than a threshold quality level for surveillance communication; and
causing the cellular transceiver to transmit the cellular signals indicating the position of the unmanned aerial ownship vehicle in response to:

determining that the unmanned aerial ownship vehicle is located outside of the identified risk volume;
determining that the quality level for cellular communication is greater than the threshold quality level for cellular communication; and
determining that the quality level for surveillance communication is greater than the threshold quality level for surveillance communication.

17. A system for transmitting a position of an unmanned aerial ownship vehicle, wherein the system is configured to be mounted on the unmanned aerial ownship vehicle, the system comprising:
a positioning system configured to receive positioning signals;
a cellular transceiver;
a surveillance transceiver; and
processing circuitry configured to:
  determine the position of the unmanned aerial ownship vehicle based on the positioning signals;
  determine that a quality level for cellular communication is less than a threshold quality level for cellular communication; and
  cause the surveillance transceiver to transmit surveillance signals indicating the position of the unmanned aerial ownship vehicle in response to determining that the quality level for cellular communication is less than the threshold quality level for cellular communication.

18. The system of claim 17,
wherein the processing circuitry is configured to determine that the quality level for cellular communication is less than the threshold quality level for cellular communication by at least determining that the cellular transceiver lost a cellular connection during a time interval, and
wherein the processing circuitry is configured to cause the surveillance transceiver to transmit the surveillance signals indicating the position of the unmanned aerial ownship vehicle in response to determining that the cellular transceiver lost the cellular connection during the time interval.

19. The system of claim 17,
wherein the processing circuitry is configured to determine that the quality level for cellular communication is less than the threshold quality level for cellular communication by at least determining that a latency for the cellular transceiver is greater than a threshold latency level, and
wherein the processing circuitry is configured to cause the surveillance transceiver to transmit the surveillance signals indicating the position of the unmanned aerial ownship vehicle in response to determining that the latency for the cellular transceiver is greater than the threshold latency level.

20. A system for transmitting a location of an ownship vehicle, wherein the system is configured to be mounted on the ownship vehicle, the system comprising:
a positioning system configured to receive positioning signals;
a cellular transceiver;
an automatic-dependent surveillance-broadcast (ADS-B) transceiver; and
processing circuitry configured to:
  determine a position of the ownship vehicle based on the positioning signals;
  determine that the ownship vehicle is located in an identified risk volume based on the position of the ownship vehicle;
  cause the ADS-B transceiver to transmit ADS-B signals indicating the position of the ownship vehicle in response to determining that the ownship vehicle is located in the identified risk volume; and
  cause the cellular transceiver to transmit cellular signals indicating the position of the ownship vehicle simultaneously with the ADS-B transceiver transmitting the ADS-B signals in response to determining that the ownship vehicle is located in the identified risk volume.

* * * * *